United States Patent [19]

Andersen et al.

[11] Patent Number: 4,718,003

[45] Date of Patent: Jan. 5, 1988

[54] METHOD AND APPARATUS FOR EXCHANGING DATA BETWEEN DATA PROCESSING UNITS

[75] Inventors: Wayne A. Andersen; Gregory H. Faust, both of Charlottesville; Gary L. Stirk, Dyke, all of Va.

[73] Assignee: General Electric Co., Charlottesville, Va.

[21] Appl. No.: 702,287

[22] Filed: Feb. 15, 1985

[51] Int. Cl.⁴ ............................................. G06S 15/16
[52] U.S. Cl. .................................................. 364/200
[58] Field of Search ......................... 364/200 MS File

[56] References Cited

U.S. PATENT DOCUMENTS 4,491,915  1/1985  Forquer et al. ..................... 364/200

Primary Examiner—Raulfe B. Zache
Attorney, Agent, or Firm—I. M. Freedman

[57] ABSTRACT

Apparatus whereby data processing units exchange information with each other through a common memory without delay caused by limiting access to the memory to one data processing unit at a time.

The invention includes a pair of random access memories (RAMS); a first logic circuit controlled by one of the data processing units (DPU) and the address signals from both DPUs; first and second sets of gates controlled by the first logic circuit to allow one DPU access to one RAM while the other DPU has access to the other RAM; and a second logic circuit (or "handshake" circuitry) to coordinate operation of the DPUs so that each DPU has read/write access to one or the other of the RAMs at all times. In operation, one DPU has access to one RAM while the other DPU has access to the other RAM. At the appropriate time, as determined by the handshake logic circuitry, the DPU access is switched between RAMs.

10 Claims, 2 Drawing Figures

METHOD AND APPARATUS FOR EXCHANGING DATA BETWEEN DATA PROCESSING UNITS

This invention relates to a method and apparatus for exchanging information between data processing units (DPUs) through a memory unit such that each DPU has simultaneous read/write access to the memory unit and each has access to the information written by the other.

BACKGROUND OF THE INVENTION

It is well known to employ multiple microprocessors or microcomputers in a system such that each microcomputer or microprocessor is dedicated to carrying out some particular function. In a coordinated system, however, it is necessary that these units communicate with each other and share operative results and perhaps a common data base. The typical method for sharing information and data between processing units is to provide a common memory to which each microprocessor or microcomputer has access on a shared basis. This is a fairly simple, straightforward scheme in which one unit is allowed random access to the memory alternatively with the other.

An obvious disadvantage of the shared memory technique is that only one processor unit has access to the memory at any given time. This may result in one unit idly standing by while awaiting access to the memory.

This problem has been particularly acute in the field of programmable controllers wherein it is often desirable or necessary to interface the programmable controller to another computer for programming or monitoring purposes. Although the shared memory technique lends itself to this interfacing need, it suffers from the same obvious problem that only one unit at a time has access to the shared memory. With the programmable controller dedicated to the control of some critical process, all undue delay must be avoided.

Accordingly, it is an object of the present invention to provide a method and apparatus whereby data processing units can exchange information with each other through a common memory without delay incurred by limiting access to the memory to only one data processing unit at a time.

SUMMARY OF THE INVENTION

The foregoing and other objects are attained by providing a pair of random access memory units, each unit of which includes an address port and a data port, and configuring these memory units in conjunction with gating and logic circuits such that the operative combination appears as a single memory unit to each of the data processing units between which information is to be exchanged. Each data processing unit may read and write to the resulting data exchange device simultaneously with the other, thus providing a means for exchanging information without delaying either data processing unit in the read/write process.

In preferred form, the invention includes a pair of random access memories (RAMS); a first logic means controlled by signals from one of the data processing units (DPU) and the memory address signals from both data processing units; first and second sets of gating means controlled by the first logic means such that these gating means allow one DPU access to one RAM while the other DPU has access to the other RAM; and a second logic means (or "handshake" logic circuitry) to coordinate operation of the DPUs such that each DPU has read/write access to one or the other of the RAMs, as appropriate, at all times. In operation, one DPU has random access to one RAM while, simultaneously, the other DPU has random access to the other RAM. At the appropriate time, as determined by the operative state of both DPUs (determined through the handshake logic circuitry), the DPU access is switched between RAMs. The result is that there is no delay in the read/write process and one DPU has access to the information deposited by the other.

BRIEF DESCRIPTION OF THE DRAWINGS

While the specification concludes with claims particularly pointing out and distinctly claiming the subject matter regarded as the invention, the invention will be better understood from the description taken in connection with the accompanying drawings in which:

DETAILED DESCRIPTION OF THE INVENTION

Figure 1:
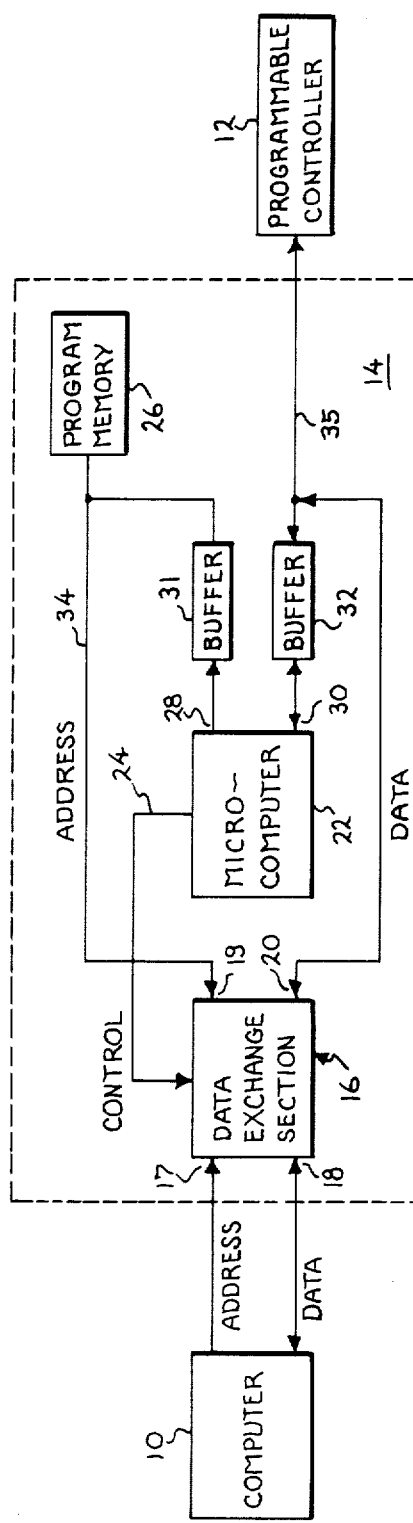
FIG. 1 is a simplified block diagram illustrating an embodiment of the invention in an interfacing apparatus between a computer and a programmable controller.

With reference to FIG. 1, data is exchanged between a computer 10 and a programmable controller 12 through interfacing apparatus 14. As a practical matter, interfacing apparatus 14 may be in a form of a printed circuit board which is installed in, and draws its power from, the computer 10. The computer 10 may be any one of a number of commercially available computers such as those currently identified as "personal computers". Similarly, the programmable controller 12 may be any one of a number of well known readily available programmable controllers. In a typical situation, the computer 10 is an adjunct to the programmable controller 12 to provide programming, monitoring, and possibly some control decisions therefor. It is not necessary to describe the inner workings of the computer 10 or the programmable controller 12 to develop an understanding of the invention; it will be sufficient to simply point out that the programmable controller 12 is operative through an input/output system (not shown) to control some apparatus or process (also not shown) depending on the status of the apparatus or process as reported by monitoring devices associated therewith.

Communications between the computer 10 and the programmable controller 12 is through the interfacing apparatus 14, which includes data exchange section 16. The data exchange section 16 is essentially a memory device to which the programmable controller 12 has access for depositing and extracting data at the same time that the computer 10 has access for the same purposes. The data exchange section 16 includes computer address and data ports 17 and 18, respectively, and programmable controller address and data ports 19 and 20, respectively. Address information from the computer 10 is provided at the address port 17 and data is exchanged with the computer 10 through the data port 18. Simultaneously, on the programmable controller side, address information is provided at the address port 19 and data is taken in and out through the data port 20.

Included in the interfacing apparatus 14 is a microcomputer 22 through which data to and from the programmable controller 12 must pass. Microcomputer 22 generally controls operation of the data exchange section 16 via control signals which appear on the control signal bus 24 interconnecting the microcomputer 22 and the data exchange section 16. Operation of the microcomputer 22 is in accordance with a program of instructions stored in the program memory 26.

The microcomputer 22 includes an address and program instruction port 28 and a data port 30. First and second buffers, 31 and 32, are connected to the address and data ports 28 and 30, respectively. The first buffer 31 thus provides a buffer for instructions and address information on address bus 34 to which the program memory 26 is connected. Data exchanged between the programmable controller 12 and the data exchange section 16 passes into and out of the microcomputer 22, for which the second buffer 32 is provided. The microcomputer 22 may, for example, be a Model 8051 device available commercially from Intel Corporation; buffers 31 and 32 may be Models LS244 and LS245, respectively, available from Texas Instruments, Inc.; and program memory 26 may be a PROM such as a Model 2764 available from Intel Corporation.

In operation, the computer 10 addresses the data exchange section 16 through the address port 17 while corresponding data is taken in and out through data port 18. Simultaneously, the microcomputer 22 addresses the data exchange section 16 via the first buffer 31, address bus 34, and address port 19 while the corresponding programmable controller data is taken in and out through data port 20. Since all programmable controller data, both to and from the programmable controller 12, is passed through the microcomputer 22, the invention may be viewed in one aspect as relating simply to an exchange of data between the computer 10 and the microcomputer 22. Thus there is an exchange of data between two data processing units (DPUs); the first DPU being the microcomputer 22 and the second DPU being the computer 10. It will, of course, be understood that the exchange of data on the microcomputer side is ultimately with programmable controller 12.

Figure 2:
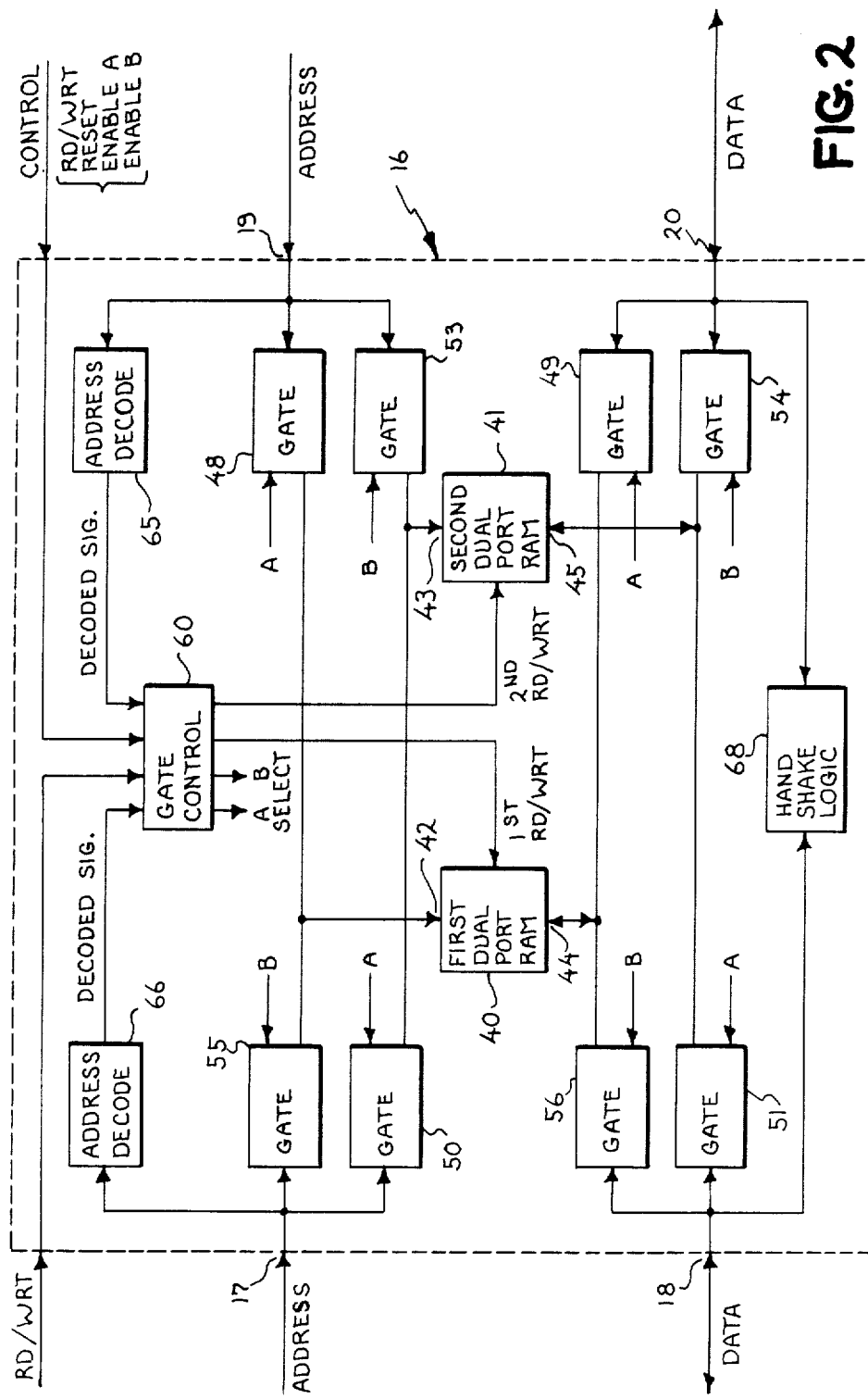
FIG. 2 is a block diagram illustrating in further detail the data exchange section of FIG. 1.

Referring now to FIG. 2, the operative components of the data exchange section 16 are shown in greater detail. A pair of random access memory units (RAMs), 40 and 41, designated first and second RAMS, respectively, are at the heart of this section. Each RAM, 40 and 41, includes an address port, 42 and 43, respectively, and a data port 44 and 45, respectively. A first set of gating means, comprising individual gates 48-51, controls access by the microcomputer 22 to the data and address ports of the first RAM 40 and controls access by the computer 10 to the data and address ports' of the second RAM 41. A second set of gating means, comprising individual gates 53-56, controls access by the microcomputer 22 to the data and address ports of the second RAM 41 and controls access by computer 10 to the data and address ports of the first RAM 40. Thus, each DPU has access to either RAM 40 or RAM 41, depending on the status of the gating means. In normal operation, only one set of gating means is on at a time; either the first set, 48-51, is off and the second set, 53-56, is on or the first set is off and the second set is on. With the first set of gates on, for example, the microcomputer 22 has random access to the first RAM 40 through gates 48 and 49 and the computer 22 has access to the second RAM 41 through gates 50 and 51. Under these circumstances, the second set of gates is off, access by the microcomputer 22 to the second RAM is denied, and access by the computer 10 to the first RAM is denied. Thus, one DPU has access to any one RAM at a time, although both have simultaneous access to one RAM or the other at all times.

Address gates 48, 50, 53, and 55 are unidirectional since they have only to pass addresses to the RAMs 40 and 41; data gates 49, 50, 54 and 56 are bidirectional to pass data both to and from the RAMs 40 and 41.

Each gate of the first sets of gating means 48-51 is controlled by one control signal and each gate of the second set 53-56 is controlled by another control signal. Although these control signals are normally complimentary, so that one set of gates is on while the other is off, they may be provided so that both sets of gates are off at the same time.

The gate control signals are derived from a gate control circuit 60 and appear on lines designated A and B. The A line is connected to each gate 48-51 of the first set and the B line is connected to each gate 53-56 of the second set. At times herein the gate control signals appearing on these lines may be referred to as the A and B control signals, respectively.

The gate control circuit 60 is a straightforward logic circuit whose function is to produce the A and B signals for controlling the on-off state of the gates and for producing first and second read/write signals which are supplied, respectively, to the first and second dual ported RAMs 40 and 41. The read/write signals, as is conventional, simply determine at any instant whether data is to be read to or from a particular RAM. Each DPU is operative to determine whether it is, at any instant, in a read mode or a write mode. Thus, each DPU originates its own read/write signals and the gate control circuit 60 simply switches these signals between the first and second RAMs 40 and 41, respectively, depending on which DPU has access to which RAM.

The gate control circuit 60 thus receives control signals from each DPU. In the illustrated embodiment however, the first DPU (i.e., microcomputer 22 of FIG. 1) is the control computer and it provides Enable A, Enable B, and a reset signal in addition to the read/write signal. The second DPU simply provides a read/write signal.

The gate control circuit 60 also receives an address decode signal from first address decode circuit 65 and an address decode signal from second address decode circuit 66. These circuits, address decode circuits 65 and 66, receive address information from, respectively, the first and second DPUs and provide decoded signals in response to addresses assigned to RAMs 40 and 41. The decoded signals, as mentioned, are provided to the gate control circuit 60 which is responsive to inhibit both the A and B signals unless the RAMs 40 and 41 are actually being addressed. The address decode circuits 65 and 66 are, of course, conventional devices well known to those of ordinary skill in the art.

Thus, in operation the gate control circuit 60 receives a read/write signal from the second DPU (computer 10 of FIG. 1); a reset signal, a read/write signal, and Enable A and Enable B signals from the first DPU; and an address decode signal from each of the address decode circuits 65 and 66. In turn, the gate control circuits 60 produces the A and B gate control signals and the read/write signals for RAMs 40 and 41. The A and B gate signals thus turn on the appropriate set of gates at the direction of the first DPU while the read/write signals are routed to the appropriate RAM. The reset signal is used to inhibit both the A and B signals in order to turn both sets of gates off when the RAMs are switched between data processing units.

The RAMS are switched from one DPU to the other when each DPU has completed its need for access to the RAM currently being accessed. This operative state or condition is determined by the handshake logic circuit 68. The handshake logic circuit 68 receives data and addressing information from both the first and second DPU (i.e., computer 10 and from microcomputer 22). When the access needs of a DPU are satisfied, it provides a bit of digital information to the handshake logic 68 to indicate that switching of the RAMs can be carried out. The handshake logic circuit 68 comprises a set of buffers and latches configured in a conventional manner readily producible by those skilled in the art. The first DPU also interrogates the handshake logic 68 and is programmed to recognize the command condition indicating that the RAMs 40 and 41 can be switched. Thus, the RAMs are switched at the appropriate time, depending on the operative state of each DPU. Accordingly, upon such recognition, the first DPU provides a reset signal and issues the appropriate enable signal to gate control circuit 60 which then effects the switch by the A and B signals. The reset signal is used to momentarily inactivate all gates during the switchover.

Thus, from the foregoing, it will be recognized that both the first and second DPU have simultaneous random access to memory locations and neither is delayed in its access requirements.

It will be recognized that, while there has been shown and described what is considered a preferred embodiment of the invention, various other modifications may be made therein. It is intended to claim all such modifications which fall within the true spirit and scope of the present invention.

The invention claimed is:

1. In interfacing apparatus between first and second data processing units (DPUs), a data exchange device into which the DPUs can read and write data simultaneously for thus exchanging data between said DPUs, such device comprising:
   (a) first and second random access memories (RAMs), each RAM having a data port and an address port;
   (b) control logic means for receiving from the first DPU control signals indicative of the operative state of each DPU, said control logic means being responsive to said control signals to generate gate control signals;
   (c) a first gating means connected to control access by said first DPU to the data and address ports of said first RAM and to control access by said second DPU to the data and address ports of said second RAM, said gating means being responsive to said gate control signals to control such access;
   (d) a second gating means connected to control access by said first DPU to the data and address ports of said second RAM and to control access by said second DPU to the data and address ports of said first RAM, said gating means being responsive to said gate control signals to control such access; and
   (e) handshake logic means receiving data from each of said DPUs, which data defines the respective states of said DPUs, for generating commands indicative of said states and providing said commands to the first DPU, said first DPU being responsive thereto to generate said control signals to determine access of said first and second DPUs to said first and second RAMs depending on the operative state of each DPU and thereby allowing one DPU to read and write simultaneously with the other.

2. The data exchange device of claim 1 wherein said first gating means comprises a first set of gates and said second gating means comprises a second set of gates.

3. The data exchange device of claim 2 wherein said gate control signals comprise a pair of signals and each gate of said first set of gates is responsive to one of said gate control signals and each gate of said second set of gates is responsive to the other one of said gate control signals.

4. The data exchange device of claim 3 further including address decoding means receiving memory address signals from each of said DPUs and providing signals in response thereto to said control logic means for determining said gate control signals such that said first and second set of gates allows either DPU access to said first and second RAM only upon receipt of valid memory address signals.

5. The data exchange device of claim 4 wherein the control logic means is operative to cause the gate control signals to enable either the first set of gates or the second set of gates or to disable both sets of gates.

6. The data exchange device of claim 5 wherein said control logic means receives a read/write signal from each of said DPUs and is further adapted to direct each read/write signal to said first or second RAM, depending on the access of said DPUs to said RAMs.

7. The data exchange device of claim 6 wherein each gate of said first and second sets of gates enabling access to the address ports of said RAMs are unidirectional and each gate of said first and second sets of gates enabling access to the data ports of said RAMs are bidirectional.

8. Apparatus for exchanging information between a programmable controller and a computer, comprising:
   (a) a microcomputer operative in in accordance with a stored program of instructions to control the exchange of information, said microcomputer receiving information from the programmable controller and the computer for providing memory address and control signals; and
   (b) a data exchange section having
      (i) first and second random access memories (RAMs), each RAM having a data port and an address port;
      (ii) control logic means for receiving from the microcomputer control signals indicative of the operative state of the programmable controller and the computer, said control logic means being responsive to said control signals to generate gate control signals;
      (iii) a first set of gating means connected to control access by said programmable controller to the data and address ports of said first RAM and to control access by said computer to the data and address ports of said second RAM, each gating means of said first set being responsive to said gate control signals to control such access;
      (iv) a second set of gating means connected to control access by said programmable controller to the data and address ports of said second RAM and to control access by said computer to the data and address ports of said first RAM, each gating means of said second set being responsive to said gate control signals to control such access; and (v) handshake logic means receiving data from the programmable controller and the computer, which data defines the respective states thereof for generating commands indicative of said states and providing said commands to the microcomputer, said microcomputer being responsive thereto to generate said control signals to determine access of the programmable controller and the computer to said first and second RAMs depending on the operative state of the programmable controller and the computer and thereby allowing the programmable controller and computer to read and write simultaneously.

9. The apparatus of claim 8 wherein said gate control signals comprise a pair of signals and each gating means of said first set of gating means is responsive to one of said gate control signals and each gating means of said second set of gating means is responsive to the other one of said gate control signals.

10. The apparatus of claim 9 wherein said data exchange section further includes address decoding means receiving memory address signals from the programmable controller and the computer and providing signals in response thereto to said control logic means for determining said gate control signals such that said first and second set of gating means allow the programmable controller and the computer access to said first and second RAM only upon receipt of valid memory address signals.

* * * * *